Patented Aug. 5, 1941

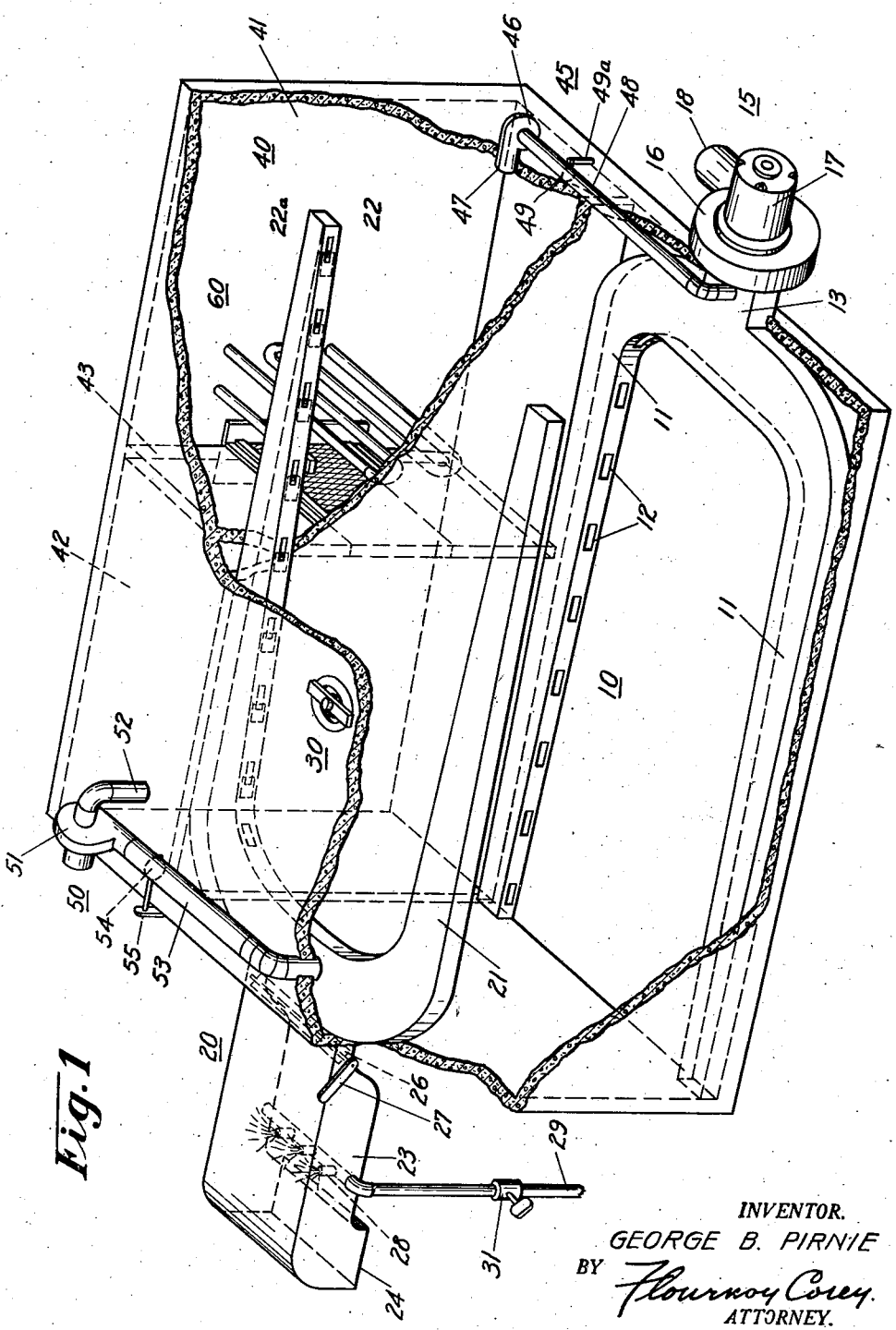

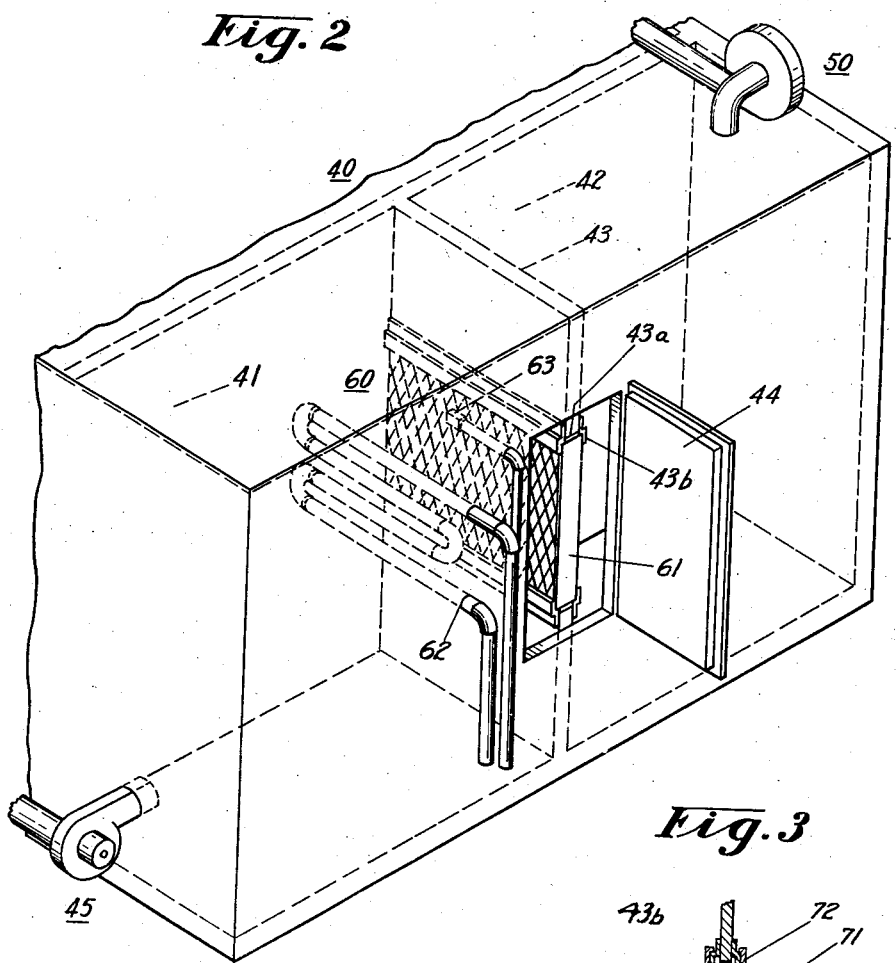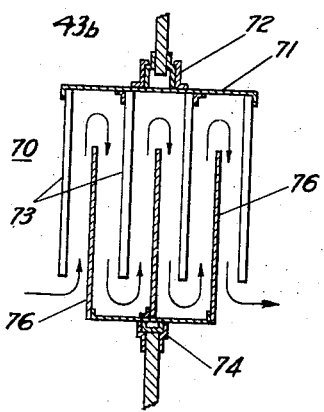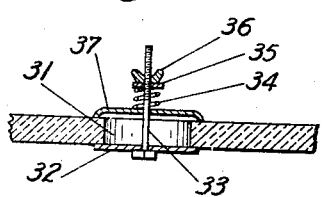

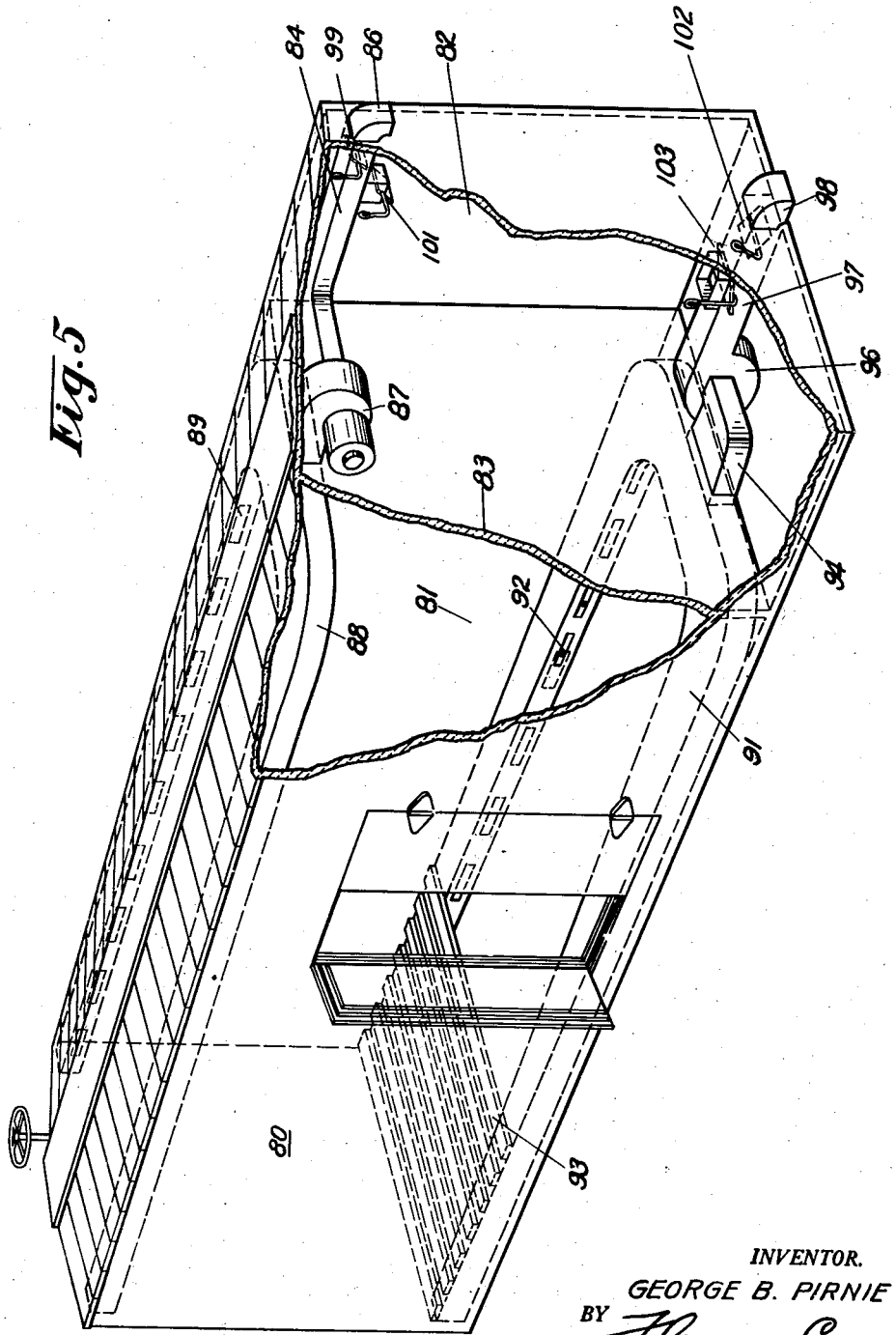

2,251,617

UNITED STATES PATENT OFFICE 2,251,617

MEANS FOR AND METHOD OF CONTROLLING TEMPERATURE, HUMIDITY, VENTILATION, AND GAS CONTENT IN WAREHOUSES

George B. Pirnie, Center Point, Iowa, assignor, by direct and mesne assignments, of one-eighth to Henry F. Gensicke, one-eighth to Thomas Pirnie, one-eighth to Edward F. Novotny, one-sixteenth to Charles A. Zisko, and one-sixteenth to Otto Sramek, all of Cedar Rapids, Iowa Application August 30, 1939, Serial No. 292,692

6 Claims. (Cl. 98—52)

This invention relates to a means for and method of conditioning, and controlling the humidity, temperature, ventilation and gas content of warehouses, and is directed particularly to warehouses for the storage of edibles, such as vegetables and fruit. This is a continuation in part of my co-pending application Serial No. 236,710.

One of the main objects of my invention is the provision of a structure capable of conditioning every portion of a storage room and capable of causing conditioned air to pass evenly over and about all portions of the commodity being stored.

Another main object of my invention is to provide a method for conditioning and controlling the moisture content of stored produce.

Another object of my invention is the provision of an inexpensive apparatus which may be used to control the temperature, humidity, and gas content of the storage space and regulate the ventilation thereof.

Another object of my invention is the provision of apparatus which may be caused to remove moisture from the surface of edibles and even from the edibles themselves if it be desired that they be stored in a dry condition.

It is another object of my invention to provide a structure capable of supplying any physical condition of the air required for the storage or conditioning of a variety of different types of vegetables and fruits, or other edibles, and distributing such air throughout the entire mass.

Since it is intended that a powerful exhaust apparatus be utilized in a structure constructed in accordance with my invention, it is therefore another object of my invention to provide a means for protecting the warehouse from possible damage that might be caused by the exhaust apparatus creating an unsafe degree of evacuation.

A further object of my invention is to provide a conditioning room, separate from the storage room, in which a supply of air may be slowly conditioned prior to use, thus making it possible to use smaller and less expensive equipment to perform the same services.

A further and specific object of my invention is the control of the various factors affecting the storage of fruits and vegetables during the heavy storage season, that is during the winter months in the colder climates such as the north central and northern States of the United States.

It is a well known fact that in the commercial storage of vegetables, fruits and grains, the shrinkage heretofore has been considerable due to uncontrolled humidity, temperature and evaporation when correct ventilation was maintained.

It is of course also well known that accumulation of detrimental gases in storage rooms, bins, etc., containing most edibles causes a breaking down of their structure and permits and causes decay, discoloring, softening and the like.

In the storage of such items as potatoes, cabbage, carrots, turnips, rutabagas, cauliflower, apples and lemons, uncontrolled evaporation results in considerable shrinkage and loss in weight and further results frequently in a change in appearance, a loss of color, luster, and weight.

It is very important in the storage of onions that they be kept dry and at a temperature close to 34 degrees F.

Sweet potatoes, however, must be stored in a relatively high temperature, but at the same time must be kept dry. In cold weather it is common practice to ventilate storage rooms containing sweet potatoes by introducing cold fresh air. This, however, has proven very detrimental to the sweet potato since it causes, through condensation of moisture contained in air at relatively high temperatures, the formation of dark-colored, sunken spots which soon decay. Such products require thorough ventilation with controlled temperature.

When damp or under-ripe grain is stored, especially in deep bins, and under ordinary conditions, mold may quickly appear. It is apparent that penetrating or thoroughly ventilating such a closely packed mass is difficult.

I have provided a means for and methods of conditioning warehouse rooms or bins for the proper storage of these various classes of items and others not mentioned, and the provision of these means and methods is among the objects and features of my invention.

Other and further features and objects of the invention will be more apparent to those skilled in the art upon a consideration of the accompanying drawings and following specification, wherein are disclosed several exemplary embodiments of the invention, with the understanding, however, that such changes may be made therein as fall within the scope of the appended claims, without departing from the spirit of the invention.

In said drawings:

Figure 1 is a view in perspective of a storage room with an adjoining conditioning room built in accordance with one embodiment of my invention.

Figure 2 is a view in perspective of the conditioning room shown in Figure 1 but in greater detail.

Figure 3 is a view in elevation of an inexpensive device, constructed according to my invention, for use in the conditioning room for removing moisture from the air.

Figure 4 is an elevational view in section of a safety vacuum valve arranged to protect the storage room against damage due to any excessively high vacuum caused by the exhaust apparatus, and Figure 5 is a view in perspective showing an ordinary freight car partly broken away to illustrate the application of the apparatus constructed in accordance with my invention.

Referring now to the drawings:

The embodiment of my invention disclosed and described in Figures 1 to 4 inclusive preferably includes or consists of a storage room, indicated generally at 10, a two-compartment conditioning room, indicated at 40, a power exhaust apparatus indicated at 15, intake apparatus shown generally at 20, ventilation and circulation equipment shown at 45 and 50, and artificial conditioning means indicated at 60.

The storage room 10 may be any kind of a storage space or bin. It may even be a round grain elevator. It is necessary that this room be relatively airtight and it is preferable that it be insulated against heat loss. Closely fitting doors (not shown) are provided in either or both the ceiling and side wall. It may of course be desirable that an opening be supplied in the floor for ease in handling such commodities as grain.

Conduits 11, preferably U-shaped, are located near the floor level of the storage room. These conduits have a plurality of intake openings 12 spaced along the side walls of the conduits in order to facilitate drawing off the air evenly from all parts of the storage space, that is, the openings 12 are distributed as widely as possible over the floor surface of the storage room so that air will be picked up by the conduits 11 from all points at the bottom of the storage space. A slatted sub-floor (not shown) may be utilized in some cases, especially with small produce, to form a plenum chamber under the produce to facilitate the distribution of air.

These conduits preferably increase in size as they converge toward a common outlet 13 which extends through one of the side walls of the storage room near the floor level. A powerful exhaust apparatus, indicated at 15, is connected to the outer end of this conduit. This exhaust apparatus may include a housing 16 and a centrifugal blower wheel therein powered by an electric motor 17. Air exhausted from the blower at the opening 18 may be directed through an additional conduit to the outside of the building if desired. The control of this exhaust blower may be made either automatic or the blower may be controlled manually.

An air intake conduit system, similar to the exhaust conduit 11, is provided at 20 and includes a U-shaped conduit system indicated at 21 having outlet ports 22 therein widely distributed about and near the ceiling of the storage room. It is preferable that the duct system be supplied with a means of adjusting the size of the ports 22 in the upper conduit and ports 12 in the lower conduit. Such a control on the air supply, as is illustrated at 22a, permits readjustment of the system so that small or large quantities of air may be passed by the blower without throwing the entire system out of balance.

The ports on both the intake and the exhaust duct systems are preferably arranged to permit individual adjustment. Each port may be furnished with an individual shutter member as shown at 22a. In the case of the ports in the intake conduit, which is as stated before located preferably near the ceiling of a warehouse, these ordinarily do not require adjustment and may generally be left wide open. If necessary, however, they may be reached at any time.

Both the intake and the exhaust conduits and the ports are of course sized in accordance with common practice to equalize or properly distribute air through the storage space under a given condition. This may be either when the storage space is empty or filled with a certain type of produce.

It will be apparent that if the warehouse is only partially filled, and especially when a large portion of the produce is stored in one end of the storage space, the air distribution system will be thrown out of balance. In order to compensate for this the ports in either or both the intake and exhaust conduits may be closed in that portion of the space not being utilized. This naturally causes all of the conditioned air to pass over and through the produce being conditioned.

The ports in the exhaust conduit may be easily reached when required since the exhaust conduit may be either built under a slatted false floor or even supported below the floor of the storage space.

The intake conduits converge at a common point and conenct with another conduit or pipe 23 leading in from the out-of-doors. This conduit is preferably curved downwardly at its outer end, as shown at 24, to prevent the entry of rain, snow, and heavy particles of dirt. This conduit is also provided with a tightly closing valve 26 which may be actuated by an operating handle 27 to tightly close the duct system to prevent the entry of air from the outside.

Spray nozzles or steam jets 28 are provided for humidifying the incoming air if and when desired, and these are connected to the water supply pipe or steam line 29 and controlled by a valve 31. This valve may be manually controlled or may, if desired, be controlled by a hydrostat or humidostat located within the storage space.

When it is desired to thoroughly ventilate the interior of the storage space and especially when the space is filled with a closely packed commodity such as grain, the exhaust blower 15 is energized. The intake valve 26 is closed at this time.

The operation of the exhaust apparatus serves to create a partial vacuum in the storage space, the degree of which may be indicated on gauges (not shown) connected with the interior of the storage space.

When the storage space has been evacuated to the proper degree the intake valve 26 is opened, allowing an inrush of fresh air, or conditioned air as desired. This fresh air will naturally fill all portions and corners of the storage space to replace the partial vacuum.

It is apparent that this method has numerous advantages over the commonly used systems utilizing blown air which naturally follows the paths of least resistance. The exhaust blower may, if desired, be operated while the valve 26 is open.

In order to prevent damage to the warehouse, such as the caving in of the walls or ceiling, if the space is evacuated to too great an extent, a safety valve indicated generally at 30 is supplied. The construction of this valve is shown in detail in Figure 4.

This valve is adjusted to such an extent that it will open inwardly and permit the entry of air into the storage space if any unsafe degree of evacuation is ever reached.

In the storage of certain types of commodities it is not necessary that they be ventilated with fresh air very often. They must, however, be periodically ventilated and with air properly preconditioned to a given temperature and moisture content and occasionally gas content.

I have, therefore, provided an adjoining conditioning room 40. This room is preferably in the form of two compartments 41 and 42 separated by a wall 43. The compartment 41 receives the air drawn in from the storage chamber by a small recirculation system indicated at 45. This recirculation system comprises a small centrifugal blower 46 preferably powered by an electric motor and exhausting into the chamber 41 through the side wall thereof and as shown at 47. The intake of this blower is connected by conduit 48 to the outlet conduit 13 of the storage space exhaust conduit system. A tightly closing valve 49 in this conduit is provided with an externally operable handle 49a.

The chamber 42 receives air from the chamber 41 which has passed over the conditioning apparatus. The other portion of the ventilating or recirculation equipment, indicated at 50, comprises a small centrifugal blower preferably powered by electricity, the intake of which is connected as at 52 to an opening in the top wall of the conditioning chamber 42. The exhaust opening of the blower 51 is connected by a conduit 53 to the intake conduit 21 of the storage room. A tightly closing valve 54 in this conduit 53 is operated by the handle 55.

The construction of the conditioning room is illustrated in more detail in Figure 2. The two compartments comprising this room are preferably constructed similar to the storage room, that is comparatively airtight and of insulating materials. A closely fitting door 44 is provided in the wall of the conditioning room opposite the partition 43 to permit access to the interior and to permit changing and adjusting the conditioning apparatus shown at 60.

The partition 43 is supplied with an opening 43a through which all the air must pass from the chamber 41 into the chamber 42. This opening is preferably arranged with slide members 43b to permit certain types of conditioning equipment to be installed by merely sliding them into place.

Filters, as shown at 61, may be installed in this opening if desired to filter out any foreign substances from the air being conditioned. These substances would include mold and other fungus growth which may be floating in the air drawn off from the storage space. This will prevent, to some extent, the reinfection of the product stored in the storage room.

The filter is preferably of the viscous throw-away type now generally available at low cost. The chamber 41 is also equipped with a steam coil or a radiator indicated at 62. A valve to regulate this radiator may be manually controlled or may be controlled automatically by a thermostat located within the conditioning room.

The humidifying nozzle 63 is also provided to add moisture to the air, either in the form of a mist directly from the water supply line, or as live steam supplied by a boiler. An electric valve may be attached to the supply line of this humidifying nozzle to control it automatically if desired from a humidostat or hygrostat located within the conditioning chamber or within the storage chamber.

It is also preferable that some means be provided within the conditioning chamber to absorb undesired moisture from the air. I have shown in Figure 3 a simple structure capable of performing that service, and which may be installed in the opening 43a in the partition in place of the filtering unit.

This de-humidifying unit, indicated generally at 70, includes a supporting frame 71 having hook-shaped slide members 72 adapted to slide upon the filter-engaging slide members 43b. Chemical absorption pads containing a material such as calcium chloride are indicated at 73, and these are suspended from this frame 71. The slide unit 74, similar to the supporting member 71, is adapted to be supported upon the edge of the partition forming the lower edge of the opening 43a. This member has upwardly extending plates, such as indicated at 76, which are disposed midway between the downwardly extending chemical pads.

The structure is arranged so that air passing through the opening 43a from the chamber 41 to chamber 42 is forced to pass through the absorption unit, pass upwardly and downwardly therethrough to rub or wipe all surfaces of the chemical pads. As soon as these pads have become saturated with moisture, they, with their supporting structures, are removed from the conditioning room and replaced with a dry unit which has been previously used and dried in a drying room or kiln.

It will be apparent from a general study of this apparatus that the physical condition of the air in the storage space may be completely changed or altered at will to suit the particular needs of the commodity being stored. Cold fresh air may be admitted if desired. If cold air is too dry it may be humidified. If a commodity must be stored at a certain temperature and a certain degree of humidity, the air may be preconditioned in the conditioning room and circulated through the storage space by the recirculation means shown at 45 and 50.

Possibilities of this apparatus, however, are best shown by its operation in connection with the storage of specific vegetables and fruits.

A large number of vegetables, including Irish potatoes, cabbage, carrots, turnips, apples, lemons etc. do not require a very close regulation of the temperature, but it is preferable that they be kept relatively cold. However, it is necessary that evaporation from their surfaces be kept down to a minimum. To do this, it is necessary that the air used for ventilation have a relatively high percentage of humidity.

Also most of these commodities do not require continuous ventilation. Some of them require ventilation only once every 8 to 24 hours, and then only enough to remove any excess or detrimental gases. Normal respiration of the fruits or vegetables tends to use up the supply of oxygen in the air and form carbon dioxide. If this is allowed to accumulate, it tends not only to ripen the fruit or vegetable, but will even tend to soften and rot the fruit.

When it is only necessary to change the air occasionally and control the temperature and humidity, the conditioning room may advantageously be used.

The conditioning room may be filled with pure fresh air by merely opening the side door 44. The door may then be closed and the air conditioned to any desired degree of humidity and temperature. Then with valve 26 closed, the recirculation systems at 45 and 50 are placed in operation and the valves 49 and 54 in the respective recirculation lines are opened. A short period of operation will serve to ventilate the entire storage room in a very inexpensive manner.

As stated before, the temperature and moisture content may be manually operated or may be completely automatically controlled by a thermostat and humidostat placed inside of either the conditioning chamber or the storage space itself.

Sweet potatoes are relatively difficult to store. The temperature must be kept relatively high, preferably around 58 degrees F., and at the same time the potatoes must be kept dry. This may be accomplished in a device constructed in accordance with my invention by filling the reconditioning room periodically with fresh outside air and conditioning it to the proper degree by heating it, if necessary, or by further cooling it by means such as a mechanical refrigeration unit (not shown).

This, however, is ordinarily unnecessary in the climate for which this unit was designed, since the outside weather is generally at or below the required temperature during the heavy storage season of this commodity.

The recirculation blower units 45 and 50 are placed in operation, their valves opened and all other valves closed in the same manner as before described to thoroughly change the air in the storage room. Any excess humidity is removed from the air by the chemical absorption pads located in the conditioning room and through which all the air must pass.

The sweet potatoes do not suffer the bad effects when using this method that they show when cold, fresh air is used to ventilate the storage room, and do not show the dark colored, sunken spots which are common when that method of ventilation is used.

Onions are frequently stored uncured. It is necessary that these be dried in the storage room. If the temperature out-of-doors is above 32 degrees F, it is possible to secure quite good results (especially if the outside air is admitted only on dry days) by simply opening the valve 26 leading to the out-of-doors and energizing the exhaust unit 15. The movement of air over the surfaces of the onions tends to dry them.

If, however, the outside temperature is below freezing, and especially at a point near zero, an entirely different method may be used.

The onions in storage are prepared by operating the small recirculation blowers 45 and 50 to recirculate heated air over the onions in storage and through the entire bin to raise the temperature to approximate 90 degrees, at which point a large portion of the moisture present in the onions and in the bin will be absorbed by the air. Air at this temperature will hold a considerable amount of moisture. The temperature of course is regulated by the heating coil 62 and such regulation may be automatic, if desired. This heating up of the onions and entire storage space removes any moisture formerly condensed on walls of the storage space and from the surfaces of the onions themselves, leaving their surfaces quite dry. The valves 49 and 54 are then closed. The exhaust blower 15 is then energized and the valve 26 to the outside is opened. As soon as this is done the inrush of cold air through the storage bin and over the onions will condense the larger portion of the moisture held in suspension in the air. This moisture in suspension, when condensed, will be formed into small mist-like particles, easily supported in the swiftly moving air, and which will be supported by that air stream and carried to the outside by the exhaust blower.

The walls of the storage space and the surfaces of the onions themselves will then be in a dry condition, some moisture having been removed from the onions themselves. This cycle of operation may be repeated as often as desired to more thoroughly dry the product.

The operation of ventilating with the outer cold air may be performed so quickly that even in sub-zero weather the vegetables stand no chance of being frosted because of the latent heat stored within them and within the walls of the storage chamber. This latent heat will immediately raise the surrounding temperature to a point above freezing as soon as the intake valve is closed and the exhaust blower de-energized.

When drying onions during foggy or damp weather, it is not advisable to let in outside damp air, and it is preferable that dry air simply be recirculated over the storage bin. This may be done by setting into operation the recirculation systems at 45 and 50 and installing calcium chloride or other chemical absorption pads such as those shown in Figure 3 in the conditioning chamber. These pads will absorb a large portion of the moisture present in the air as it is circulated over them and may be replaced by dry units when they become saturated.

Complete control may be had over fruits such as bananas which may be caused to ripen as desired. An additional amount of carbon dioxide, added to the air in the storage room enclosing the bananas, tends to ripen the fruit. With my apparatus, any amount of such a gas may be added to the air in the conditioning room. This air may then be recirculated through the storage room until the fruit is as ripe as desired. The entire operation is completely under control since it may be stopped at any time by closing off the recirculation blowers and exhausting the air in the storage room by means of the exhaust blower.

I have devised a structure capable of performing very quickly and very inexpensively, practically all of the operations ever required to condition a space for storage of fruits, vegetables or other edible materials. A structure built in accordance with my invention is capable of ventilating a storage space completely, even with very low outside temperatures and with little or no danger of frosting the fruits or vegetables being conditioned. This is made possible by the speed of conditioning which may be attained by the method of causing air to move through the storage space. I have provided a device capable of controlling the temperature, the humidity, and ventilation of the storage space, and also adaptable to permit any gases to be added or removed, either to speed up or prolong the period of dormancy of fruit or vegetables.

A structure made in accordance with my invention and using my method make it possible to thoroughly condition the air, not only surrounding a mass of produce but to a large extent within the mass, such as within barrels, casks and packages. Replacing the air in a warehouse with fresh air would therefore also replace to a certain extent the air within the containers themselves.

It is apparent that when sufficient cool, warm, dry or humid air is introduced into a storage space at high speed to thoroughly condition the space, it is necessary to ventilate for short periods only. This naturally prevents excess evaporation generally caused by continuous ventilation.

I have illustrated in Figure 5 a modification of the structure necessary to condition a storage space. The structure shown is more simple in construction requiring only one intake and one exhaust blower and utilizing a conditioning room with intake and exhaust conduits arranged so as to be located all on one end of the warehouse structure, thus making possible and practical the application of the conditioning system to such devices as railway freight cars, refrigerator cars or transport trucks used in transporting food products or other produce and requiring conditioned storage. Figure 5 illustrates such an application.

The structure illustrated in Figure 5 may of course be applied to any storage space and may be preferable in some cases to that shown in Figure 1.

In the modified structure shown, a freight car is indicated generally at 80 having a produce storage space 81 and a conditioning chamber 82 located at one end of the car. All of the walls of the car, including the partition 83 between the storage space and the conditioning chamber, are preferably insulated in accordance with the usual practice in refrigerator cars. An air intake conduit 84 located in the conditioning chamber is connected with an intake elbow 86 preferably passing through the end wall of the car. This intake elbow prevents the entry of snow or rain. An intake blower 87 within the conditioning chamber and connected with this intake conduit supplies air to an intake or supply distribution system 88 preferably located near the ceiling of the storage space.

This supply conduit system may be made in a form similar to that shown in Figure 1, or may be constructed in any other form in accordance with common practice. The supply conduit system is of course supplied with a plurality of ports 89, each of which is preferably individually adjustable in the same manner as in the embodiment of the invention shown in Figure 1.

An exhaust conduit system 91 having adjustable ports 92 is preferably located beneath a slatted false floor shown in part at 93. A conduit member 94 extending through the partition and into the conditioning chamber connects the exhaust system with an exhaust blower 96. A conduit 97 leads from this exhaust blower to the outside of the car and preferably through the end wall of same as shown at 98. This exhaust opening is also preferably covered by a downwardly extending elbow to prevent entry of snow or sleet.

The conditioning chamber may of course be supplied with any desired means for conditioning the air. Means such as those shown in the conditioning room in Figure 2 may be utilized or mechanical refrigeration or ordinary ice may be used, as in standard refrigerator cars. Suitable false floor means of course may be provided in the conditioning chamber to protect the exhaust blower and other mechanism in case ice or the like is used in the chamber.

In order to control the passage of outside or conditioned air through the duct system, I have provided the intake conduit 84 with a valve 99 to control the entry of air from the outside. A second valve 101 in the intake conduit connects with the interior of the conditioning chamber. These two valves permit air to be selectively drawn from either the outside or from within the conditioning chamber, a part from each, or they may both be entirely closed.

The exhaust conduit 97 is also provided with a valve 102 to close the opening leading to the outside of the car. A second valve 103 in this conduit opens in the conditioning chamber. Each of these valves is preferably arranged to permit operation from the outside of the car.

It will be apparent that proper manipulation of these four valves will make it possible to either circulate entirely fresh outside air or recirculate air conditioned as required, or circulate a partially conditioned air.

It is also possible, by closing the intake valves 99 and 101 and opening the exhaust valve 102, to partially evacuate the freight car in the same manner as previously described in connection with the embodiment of the invention shown in Figure 1. When sufficiently evacuated, valve 99 may be opened as previously described, to permit a sudden inrush of fresh air. This method of handling makes it possible to condition the contents of closed containers such as barrels, casks and the like.

In case dry ice is used in the conditioning chamber for cooling, the carbon dioxide gas given off may in some cases be detrimental to produce stored since it would promote ripening in many cases. In such case, it might be advisable to close the ports in both exhaust and intake conduits and install conduits to connect the extreme ends of the intake conduit and the adjacent ends of the exhaust conduit. Of course all cooling effect thus secured would be through conduction through the walls of the conduits and would not serve for ventilation.

If heated air is circulated from the conditioning chamber through the storage space previous to the evacuation of the storage space, and if cold outside air is then permitted to rush through the storage space and be exhausted through the exhaust blower, the same results will be obtained with this structure as with the structure shown in Figure 1.

In the northern and north central States in particular, a large amount of produce is shipped during the late summer months, at which time the outside air, especially at night, is quite cool.

A car arranged to be conditioned in the manner shown makes it possible to utilize this cool night air by operating the blowers during the night and closing them off during the day. The amount of cold thus stored up in the produce itself is frequently sufficient to protect the product during the next day. This makes it unnecessary to ice the car, as is necessary in the case of the ordinary type of refrigerator car.

It is of course possible to otherwise condition produce in transit, as for example by recirculating carbon dioxide from the conditioning chamber to ripen bananas or the like while in transit.

It is apparent that such a structure when constructed in accordance with my invention constitutes a simple and inexpensive means for and method of supplying proper conditions to preserve and store fruits or vegetables, especially during the cool weather. I have, however, adapted the device and provided means for all year round use.

Although I have shown and described certain specific embodiments of my invention, it is apparent that modifications thereof may be made by those skilled in the art. Such modifications may be made without departing from the spirit and scope of my invention as set forth in the appended claims.

I claim as my invention:

1. In the storage of produce requiring a cool, dry atmosphere, a method of conditioning comprising heating the air in the storage room surrounding the produce to a relatively high temperature to cause moisture to be removed from the produce and from the walls of the storage chamber and be held in invisible suspension in the air, and then passing relatively cold air through the storage room at relatively high velocity whereby the moisture in the warm air of the storage room will be precipitated and carried off in visible suspension.

2. A produce storage and conditioning structure including a storage space, supply and exhaust conduit systems within the storage space, a separate conditioning room, a supply blower exhausting into the supply conduit, an intake conduit connected to the blower, a valve connected therewith and with the conditioning chamber, another valve also connected therewith and with the outside of the structure, an exhaust blower connecting with the exhaust conduit system, a valve between the exhaust of said blower and the conditioning room, and another valve between the exhaust of said blower and the outside of the structure.

3. In a vehicle for transporting produce, a main storage space, a conditioning compartment adjacent one end thereof, supply and exhaust conduits within the storage space, a supply blower located within the conditioning compartment and exhausting into the supply conduit, a supply pipe for the blower connecting with the outside of the vehicle, a valve to close off the outside opening, a second valve opening from the supply pipe into the conditioning compartment, an exhaust blower in the conditioning compartment connecting with the exhaust conduit system and having a valve exhausting into the conditioning chamber and another valve exhausting to the outside, and means for operating the valves and controlling the blowers.

4. In the storage of produce requiring a cool dry atmosphere, the method of conditioning comprising heating the air in the storage room surrounding the produce to a relatively high temperature to cause the air to absorb a maximum amount of moisture from the produce and from the walls of the storage room, partially evacuating the storage room, suddenly supplying air at relatively low temperature to precipitate moisture in the air, and then immediately removing the air from the storage room and replacing it with fresh air to remove the precipitated moisture while still in suspension and before it is deposited within the storage room.

5. In a produce storage and conditioning warehouse, a produce storage chamber, an auxiliary conditioning chamber, intake conduit means positioned in the upper part of the storage chamber, exhaust conduit means positioned in the lower part of the storage chamber, a large capacity exhaust blower connected to the exhaust conduit, a fresh air intake of relatively large capacity connected to the intake conduit, whereby fresh cold air may be drawn through the storage chamber at high speed to replace the air in the chamber, condense moisture in the air in the chamber and remove it before the produce in the chamber can become chilled, a re-circulation blower of relatively low capacity also connected with the exhaust conduit, discharging into the auxiliary conditioning chamber, means within the conditioning chamber for conditioning air, means for returning the conditioned air to the storage chamber through the intake conduit, and valve means for permitting selective operation of the large capacity blower and the re-circulation blower.

6. In a vehicle for transporting produce, a produce chamber, a conditioning compartment adjacent one end thereof, an intake conduit having widely distributed ports disposed in the upper part of the produce chamber, an exhaust conduit disposed in the lower part of the produce chamber, an exhaust blower in the conditioning chamber, connected with the exhaust conduit, conduit and valve means for selectively discharging into the conditioning chamber and outside the vehicle, and conduit and valve means connected to the intake conduit for selectively permitting the entry of air from the conditioning chamber for re-circulation and from the outside of the vehicle.

GEORGE B. PIRNIE.